A. E. DEMPSEY & O. STEINBAUGH.
STICK CANDY MAKING AND APPARATUS FOR SAME.
APPLICATION FILED APR. 20, 1914.
1,221,423.
Patented Apr. 3, 1917.
2 SHEETS—SHEET 2.
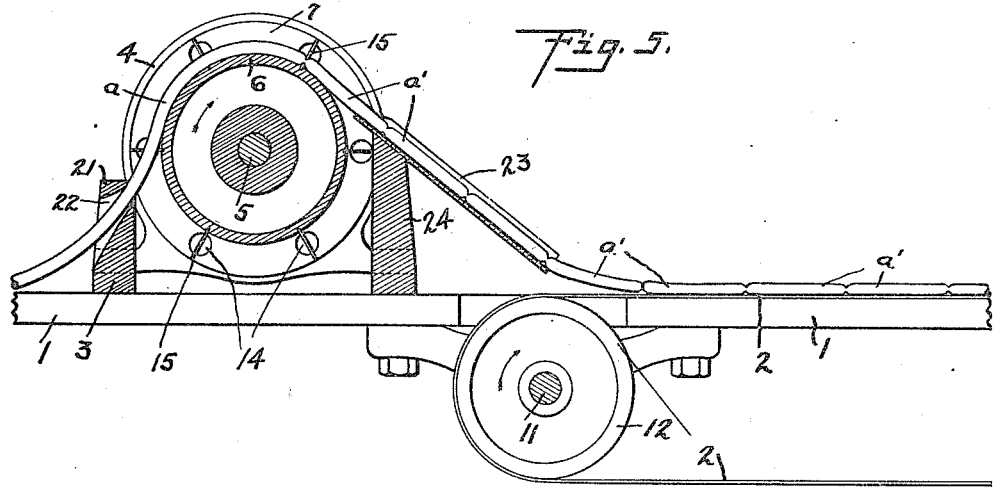
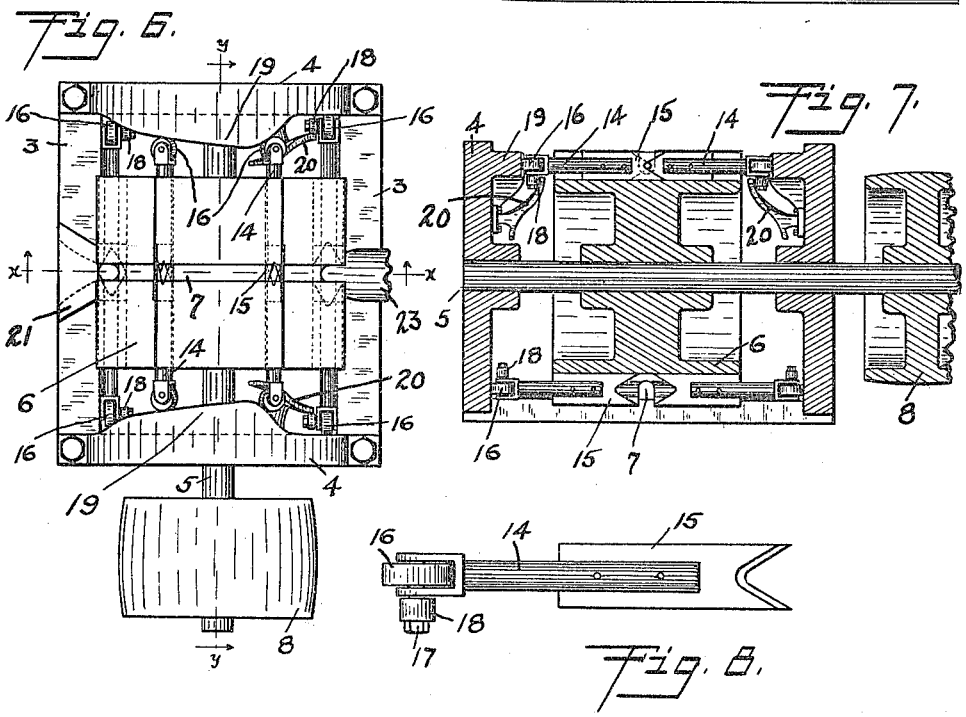

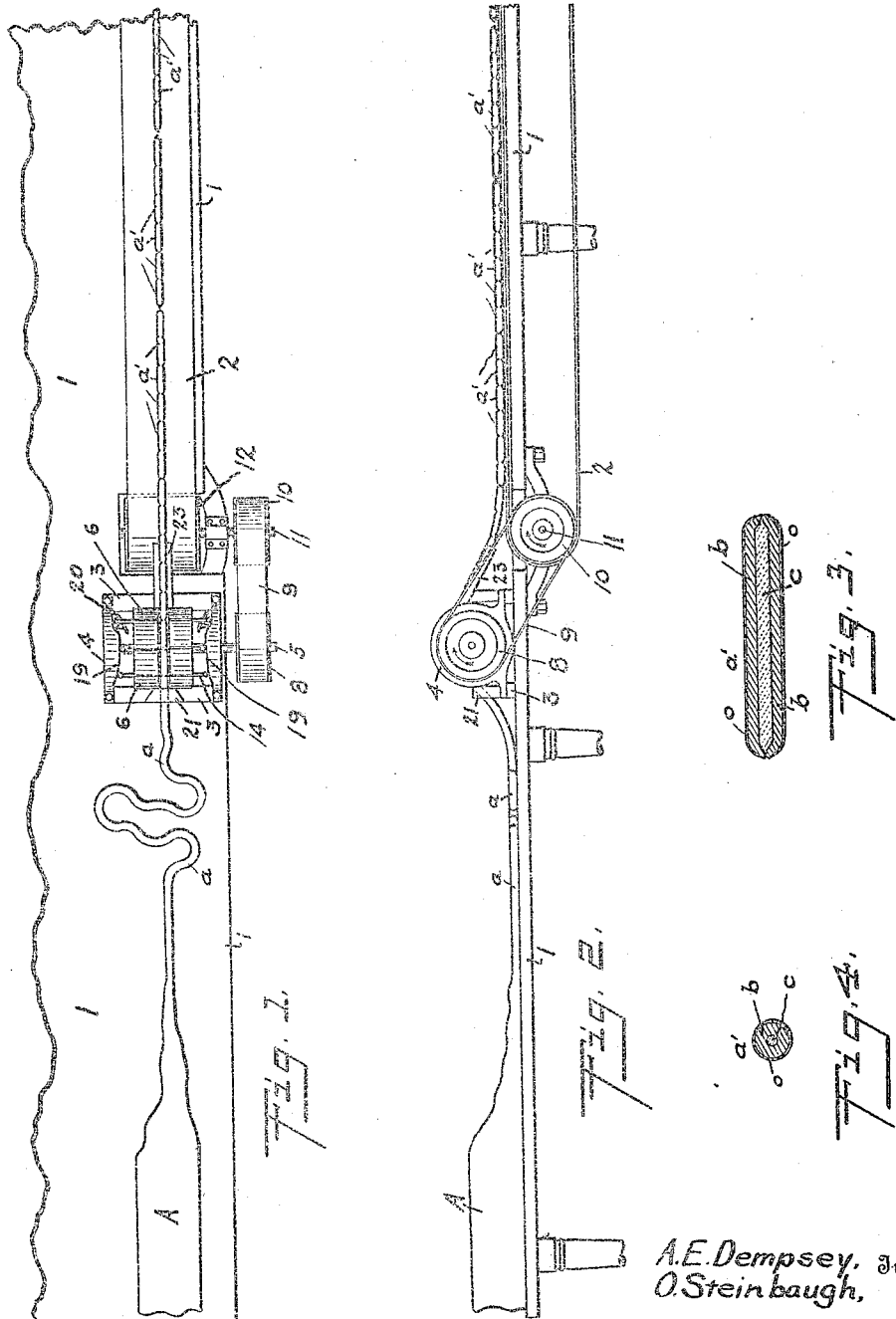

UNITED STATES PATENT OFFICE.

ARTHUR E. DEMPSEY AND OLIE STEINBAUGH, OF COUNCIL BLUFFS, IOWA.

STICK-CANDY MAKING AND APPARATUS FOR SAME.

1,221,423.   Specification of Letters Patent.   Patented Apr. 3, 1917.

Application filed April 20, 1914. Serial No. 833,186.

*To all whom it may concern:*

Be it known that we, ARTHUR E. DEMPSEY and OLIE STEINBAUGH, citizens of the United States, and residents of Council Bluffs, in the county of Pottawattamie and State of Iowa, have invented certain new and useful Improvements in Stick-Candy Making and Apparatus for Same, of which the following is a specification.

Our invention relates to the art of confectionery making, and especially to the manufacture of candy in stick form. It is the object of our invention to provide means for the rapid production of stick-candy in pieces of uniform size and shape, said means being especially adapted for the making of candy in sticks having a soft core-portion confined within an outer portion or shell of a material which is plastic when first formed, but which hardens on cooling so as to confine the permanently soft or plastic core-portion.

In the accompanying drawings Figure 1 is a plan view of the apparatus provided by our invention, Fig. 2 is a front elevation of the same, Fig. 3 is a longitudinal section of the product, Fig. 4 is a transverse section of the same, Fig. 5 is a detail transverse section of the constricting machine, on the plane of the line $x$—$x$ of Fig. 6, Fig. 6 is a plan view of the machine, Fig. 7 is an axial section thereof on the line $y$—$y$ of Fig. 6, and Fig. 8 is a detail side view of one of the constricting plungers.

In the manufacture of stick-candy in accordance with our invention, a mass of the candy material A, after the usual preliminary treatment and cooling to a temperature at which it is of a semi-solid or plastic consistency, is placed upon a table 1. The mass of material is formed by hand into an approximately cylindrical shape, and from one end of the mass there is drawn out a substantially cylindrical stick $a$ which is of uniform diameter and which, when first formed, is quite flexible. In general the manipulation of the plastic mass and the manner of drawing out the stick therefrom are well-known to confectioners, and are regularly employed in the manufacture of stick-candy.

After the drawing of the stick from the plastic mass has been commenced, the end of the stick is started through the constricting machine which is disposed at one side of the table 1, at the end of the portion of said table which supports the plastic mass A and on which the flexible stick $a$ is laid when first drawn from the mass. The machine is operated at a speed proportioned to the rate at which the stick $a$ can be supplied thereto as it is drawn from the plastic mass. From the constricting machine the stick passes onto a continuously-moving belt 2 which extends along the edge of the table 1, as shown, and is of such length that the stick may cool enough to be rigid before reaching the end of the belt.

The constricting machine has a frame consisting of cross-pieces 3 and circular end-plates 4, the latter having foot-portions secured to the ends of the cross-pieces. At the centers of the end-plates are formed bearings for a shaft 5 which carries between the plates a wheel 6 having a central peripheral groove or channel 7. On the front end of the shaft 5 is a pulley 8 which is connected by a belt 9 with a pulley 10. The latter pulley is carried by a shaft 11 which is driven by the pulley 12 of the conveyer-belt 2. In the rim-portion of the wheel 6 are a number of cylindrical openings which extend parallel to the axis of the shaft, being spaced uniformly about said axis, and each intersecting the central peripheral channel 7. In said openings are slidably disposed the plungers 14, each of which carries a blade 15 which fits slidably in a radial slot or kerf intersecting the opening for the respective plunger. The plungers are arranged in pairs, being disposed so that the inner end-portions of the blades of each pair may overlap each other when the plungers are pushed in toward the channel 7. In the end of each of the blades is a V-shaped notch, slightly rounded at the apex, and the edges of the notch are beveled or chamfered, as shown in Fig. 8, so as to be comparatively sharp. On the outer ends of the plungers are rectangular heads which are slotted to receive rollers 16 revolubly mounted therein on pivot-pins 17. The axes of the pins 17 are radial to the shaft 5, and on the inner ends of the pins are mounted small rollers 18. On the inner sides of the upper parts of the end-plates 4 are formed cams 19 which are adapted to be engaged by the rollers 16 so that as the wheel 6 is turned in the direction indicated the pairs of plungers will be pushed in toward each other and the ends of the blades 15 caused to overlap so that the notches therein will form a progressively decreasing quadrangular opening between the blades, as shown in Fig. 6. As the rollers reach the crests of the cams the opening becomes substantially circular, being formed by the rounded apexes of the notches, as shown in Fig. 7. As the plungers reach the inward limit of their movement, the rollers 18 engage the cam-plates 20, which are arranged as shown, and the plungers are thereby pulled outwardly until the ends of the blades 15 no longer project into the channel 7. The plungers then remain in the outer position until the wheel has moved around far enough to bring the rollers 16 again into engagement with the cams 19.

On one of the cross-pieces 3 is a lug 21 which extends up adjacent to the upwardly-moving side of the wheel 6. In said lug is a conical opening 22, shown in Fig. 5 and by dotted lines in Fig. 6, the smaller end of the opening being in proximity to the channel 7 in the wheel. On the opposite side of the wheel is an inclined trough 23 which is carried by a lug 24 on the cross-piece, and of which a portion at the upper end extends into the channel 7, while the lower end extends adjacent to the surface of the conveyer-belt 2.

The flexible stick $a$, after passing through the opening in the guide-lug 21, enters the channel 7, is carried around the upper part of the wheel within the channel, and thence passes down the trough 23 to the conveyer-belt. As the stick enters the channel 7 it is engaged by a pair of the blades 15 which are pressed in toward it by the cams 19 as before described, and such engagement of the blades with the stick causes the same to be pulled over the wheel without slipping thereon. As the plungers are pushed farther inward, after the first engagement of the stick by the blades, the stick is gradually constricted by the sharp edges of the notches in the ends of the blades, until at the farthest inward position of the blades the engaged portion of the stick is reduced to the size of the opening formed by the rounded apex of the notches, as shown in Fig. 7. The stick is thus formed into a plurality of pieces $a'$, of which the main body is cylindrical and the ends are rounded to an approximately semispherical form, and each piece is joined to the preceding one by a small neck-like portion of the material.

It is preferable that one pair of the blades be arranged so as to constrict the stick slightly more than the other pairs of blades, and when this is done the strength of the stick at the point of greatest constriction is so reduced that it will break there more readily than at the other constricted points. The drive-pulleys 8 and 10 are so proportioned to each other that the conveyer-belt will move very slightly faster than the stick is fed thereto by the machine, and this causes a slight tension upon the jointed stick as it emerges from the machine. A further slight tension is caused by the contraction of the stick due to its cooling as it is carried along by the belt. As a result of the tension produced by these two causes, and of the greater fragility of the stick at the points of greatest constriction, the stick will be pulled apart at said points and will form sections each consisting of a number of the pieces $a'$ equal to the number of pairs of plungers and constricting-blades of the machine. Such separated sections, each having a uniform number of the pieces $a'$, are indicated at the right of Figs. 1 and 2. These sections are of convenient length for handling, and are manually pushed off the moving belt onto the surface of the table 1 after they have been carried a suitable distance by the conveyer-belt. After the material is thoroughly cooled the pieces $a'$ are readily broken apart and, owing to the regularity of their length and the rounded form of the ends, the pieces present a neat, uniform and attractive appearance.

The described means of forming the pieces $a'$ may be used for all the ordinary forms of stick-candy, but is especially adapted for the making of sticks or pieces wherein the outer part is formed of any materials such as are ordinarily used in this class of confections and which harden on cooling, but wherein there is an inclosed core of a material that is permanently soft or plastic. In Figs. 3 and 4 there is shown one of the sticks $a'$ having a core $c$ of such soft material which is inclosed by the main body $b$ of hard material. There is also represented a thin outer layer $o$ of a material that may be striped, colored or otherwise ornamental in appearance. Such a confection as above described cannot be made by the ordinary stick-forming methods wherein pieces of the desired length are formed from a long or continuous stick by cutting or breaking the same off after cooling, since the soft core-portion would then escape from the ends of the pieces. With the present invention, however, the long or continuous stick is gradually constricted at the ends of the pieces while the whole body of the stick is still in a plastic state, and the material $b$ is thus pressed together at the ends of the pieces, so that said material forms a seal at the ends, sufficient to retain the soft core-material therein.

Now, having described our invention, what we claim and desire to secure by Letters Patent is:

1. Stick-candy making apparatus comprising a rotating wheel having a peripheral channel therein, pairs of plungers slidable longitudinally of the wheel in openings made therein at opposite sides of the peripheral channel, blades carried by said plungers and having V-shaped end-portions adapted to extend into the peripheral channel, the blades of each pair of plungers being adapted to overlap so that during movement toward each other the notches thereof form a progressively decreasing opening coincident with a part of the peripheral channel, and cams for actuating the plungers of each pair simultaneously and in opposite directions.

2. A machine for constricting a plastic candy-stick at uniformly-spaced intervals without severance of the stick at the constricted points, comprising a rotating wheel having a smooth annular peripheral channel, means for directing a continuous plastic stick into said channel at one side of the wheel, means for directing the stick out of the channel at the opposite side, a conveyer moving coördinately with the wheel and arranged to receive the continuous stick from the latter directing means, pairs of bifurcated elements mounted on the wheel at opposite sides of the channel, and means for moving said elements to overlapping relations to constrict the plastic stick without severing the same during its passage through the channel.

In testimony whereof we have hereunto subscribed our names in the presence of two witnesses.

ARTHUR E. DEMPSEY.
OLIE STEINBAUGH.

Witnesses:
D. O. BARNELL,
E. N. WRIGHT.

Copies of this patent may be obtained for five cents each, by addressing the "Commissioner of Patents, Washington, D. C."